United States Patent Office 3,527,636
Patented Sept. 8, 1970

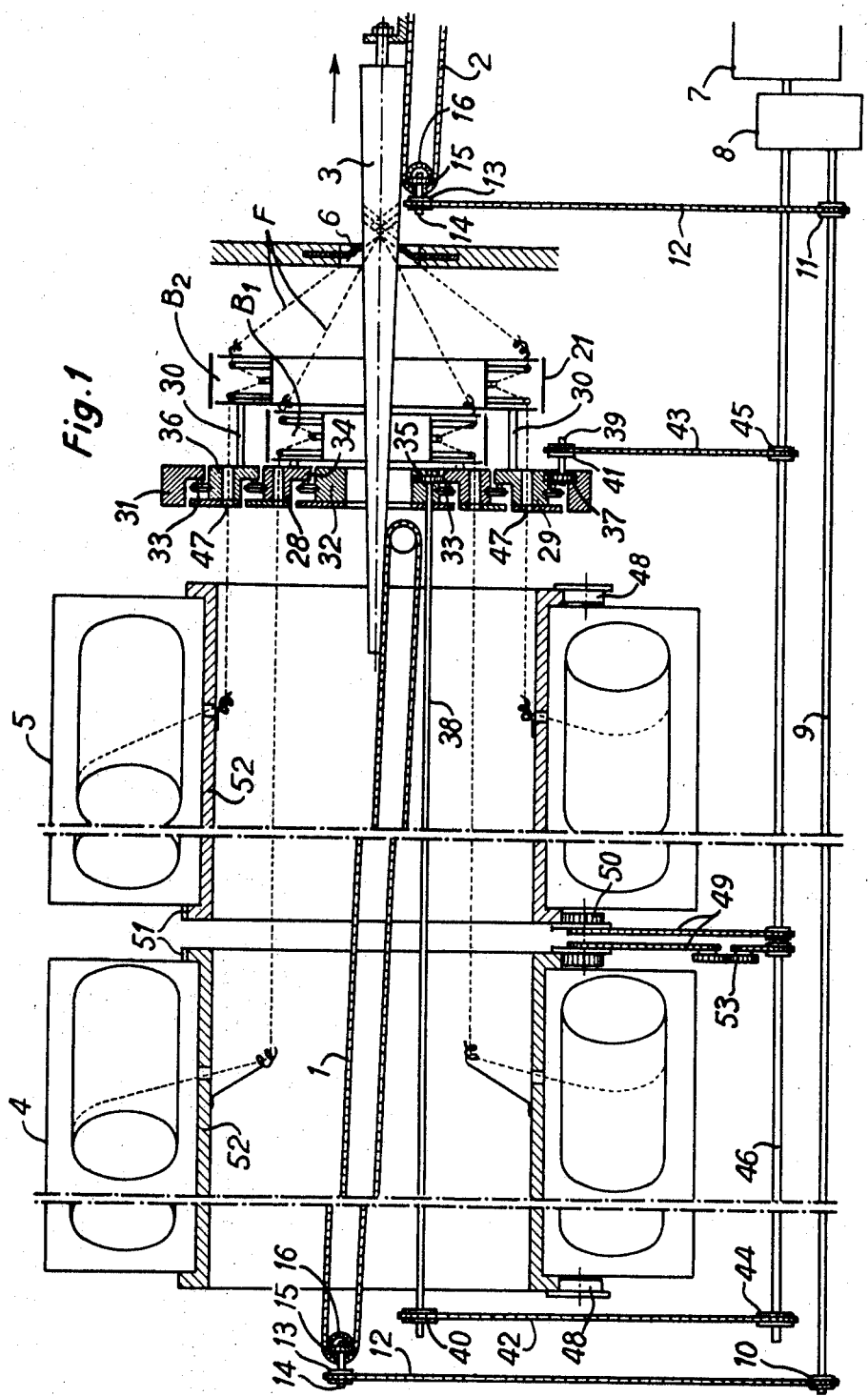

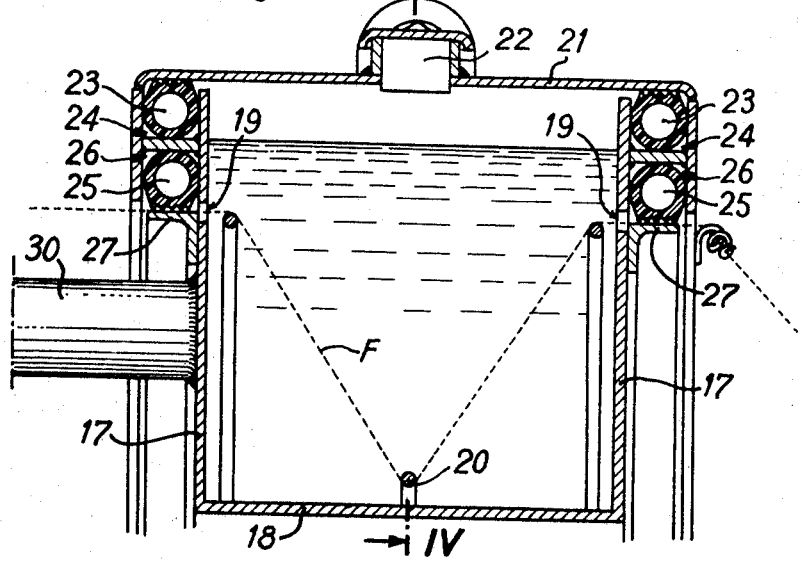
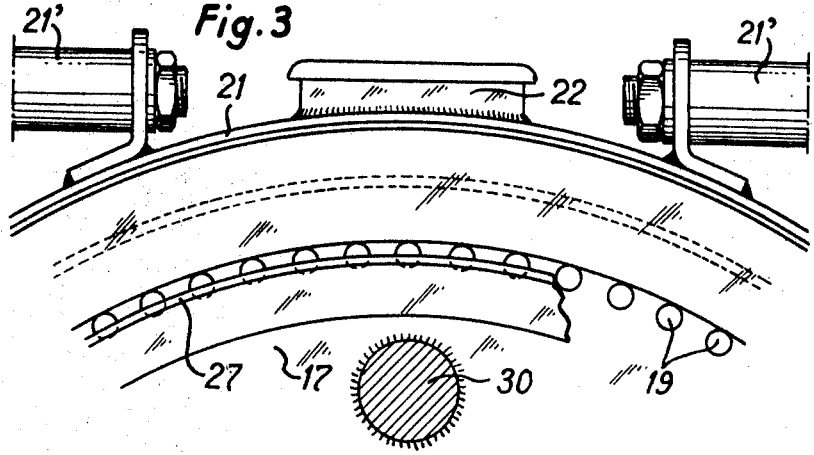
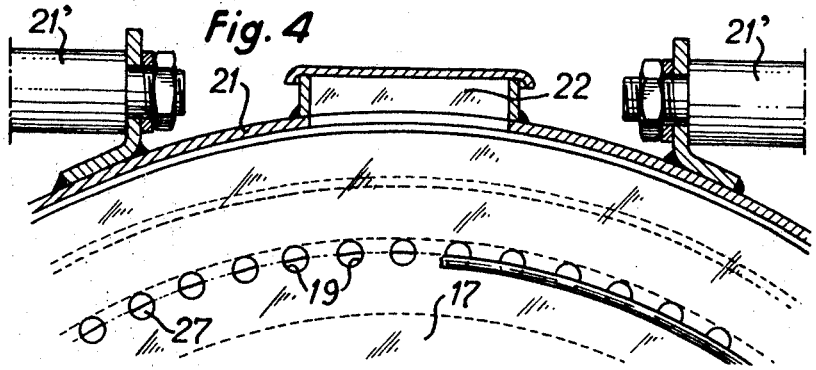

3,527,636
MACHINE FOR THE MANUFACTURE OF FIBRE-GLASS TUBING
André Maurice Chartier, Paris, France, assignor to R.D.T. Societe pour l'Etude la Realisation et la Diffusion des Techniques Modernes
Filed Oct. 17, 1966, Ser. No. 587,159
Int. Cl. B31c 3/00; B65h 81/04, 81/08
U.S. Cl. 156—425                                           8 Claims

ABSTRACT OF THE DISCLOSURE

The invention relates to a machine for making synthetic resin tubing reinforced by glass threads wherein the threads are drawn through a vessel filled with the resin by a horizontally extending mandrel arranged coaxially with the vessel.

---

This invention relates to a machine for the manufacture of glass fibre reinforced resin tubing.

Machines for the manufacture of synthetic resin tubing reinforced by means of glass threads are already known which comprise notably a vertical rigid mandrel driven into axial translation and on which the threads, previously impregnated with resin are helically wound in a plurality of layers forming crossed helices.

With such vertical mandrel type machines, it is not possible to manufacture continuous tubing and the length of the tubing elements made with such machines is generally small since it is limited by the height of the workshop in which are located said machines.

The machine according to the invention comprises a fibre thread distributor means, at least one impregnation annular vessel filled with resin through which the threads are drawn by a horizontally extending mandrel coaxial with said vessel, means for moving said mandrel axially away from said vessel, and means for rotating said vessel and distributor means at substantially the same speed.

According to another feature of the invention said annular vessel is provided on each of its lateral faces with a series of circumferentially located small holes providing passages for said threads.

Such an arrangement permits obtaining many advantages: With said machine it is possible to use threads of non-impregnated fibres; this facilitates changing the kind of resin used or the colour of the threads. Furthermore when the thread supplying spools are emptied, it is possible to easily put in operation new spools by simply connecting the respective ends of the threads with a knot. This may be effected before the thread is impregnated since the knots pass without trouble through the wiping device.

Other characterizing features and advantages of the invention will appear in the following description which is to be read with the accompanying drawings in which:

FIG. 1 is a longitudinal cross-sectional diagrammatic view of the machine;

FIG. 2 is a partial cross-sectional view, at a larger scale of an impregnation vessel;

FIG. 3 shows the upper portion of the vessel of FIG. 2 seen from the left;

FIG. 4 is a cross-sectional view taken along line IV—IV of FIG. 2.

Considering now the drawings, the machine comprises two belt conveyors 1 and 2 supporting a horizontal mandrel 3 on which are helically wound, after their impregnation, threads F supplied by two distributors 4 and 5 arranged coaxially with respect to the axis of the mandrel and adapted to rotate about said axis under the action of a device which will be described hereinafter.

The two conveyor belts 1 and 2 are located on both sides of a gauging draw-plate 6, they are driven at the same speed by an electric motor 7 controlled by a speed variator 8 through the intermediary of a shaft 9 carrying two sprocket wheels 10 and 11. Each of said wheels drives a chain 12 transmitting the movement to a sprocket wheel 13 keyed on a shaft 14 carrying at its free end a conical pinion 15 driving in rotation a corresponding conical pinion 16 secured to the driving roller of the respective conveyor belt (1 or 2).

The axial displacement of the mandrel 3 is provided by the belt conveyor 2 on which is affixed one of its ends. Thus, the translation speed of mandrel 3 and thereby the pitch of the helices of threads F may be easily adjusted by means of variator 8.

Both conveyor belts are located inside a support (not shown) consisting for instance of a girder beam and comprising suitable means for lifting or lowering said belts according to the size of the mandrel and for modifying their slope according to the apex angle of said mandrel if the latter is conical.

According to the invention, the impregnation of the two layers of threads F supplied by the distributors 4 and 5 is effected in vessels $B_1$ and $B_2$ filled with resin and located between the gauging draw-plate 6 and said distributors. These vessels $B_1$ and $B_2$ which have an annular shape, are coaxially disposed with respect to the mandrel 3 and adapted to rotate about their axes.

The two vessels are located side by side and their overall diameters are different.

As better viewed in FIG. 2, each vessel is comprised of two parallel extending annular flanges 17 connected together by a cylindrical inner wall 18.

In the vicinity of their outer periphery, flanges 17 are provided with a circumferential row of equidistant small holes 19. The threads F enter and leave the vessel through these holes 19 and they are resin impregnated while passing through. The path of the thread in the bath of impregnating resin is substantially lengthened thanks to a split ring 20 having an inner diameter smaller than the one of the holes 19.

Each vessel is closed by an outer wall formed of a fixed ring 21 secured by means of brackets 21' located at right angles with respect to the axis of the vessel and secured to the base (not shown) of the machine.

Rings 21 are each provided with an opening 22 formed through their top portion to permit the pouring of impregnating resin into the vessels.

A good fluid-tightness is obtained between the rotating vessel and the fixed outer closing ring 21 by means of two annular seals 23 received in annular grooves 24 located outwardly of flanges 17.

The annular seals 23 are made of flexible deformable material and may be inflated by introduction of a fluid under pressure, the expansion of such seals being limited on the one hand by the inner wall of the fixed outer ring 21 and on the other hand by the bottom of groove 24.

The fluid tightness of the vessels at the location of the circumferential rows of holes is provided by means of two annular seals 25 similar to seals 23 which are received in a respective annular groove 26, located outwardly of flange 17. Each groove 26 is so disposed that the bottom thereof is adjacent to the bottom of the corresponding groove 24.

After they have been inflated, seals 23 apply the threads F against an annular axially projecting extension of flange 17 located in the vicinity of the circumferential rows of holes.

By a suitable adjustment of the fluid pressure in the seal 25 located at the outlet of the threads from the vessel it is possible to control with accuracy the thickness of the resin film around each thread.

The vessels $B_1$ and $B_2$ are affixed by connecting rods 30 to coaxial crowns 28 and 29 respectively to rotate in unison with said crowns about the axis of the mandrel 3. These crowns 28 and 29 are coaxially located between two fixed supporting crowns 31 and 32.

Biconical rollers 33 interposed between the different crowns permit the rotation of crowns 28 and 29 independently from one another and impede their axial movements.

Crown 28 is provided with internal teeth 34 in meshing engagement with a pinion 35, whereas crown 29 comprises external teeth 38 in meshing engagement with a pinion 37.

Pinions 35 and 37 are secured at the ends of shafts 38 and 39 respectively which carry sprocket wheels 40 and 41 driven in rotation by chains 42 and 43 passing over driving pinions 44, 45 both keyed on a shaft driven in rotation by motor 7.

Crowns 28 and 29 being driven from the same shaft thus rotate in opposite directions. The pinions 35 and 37 are suitably selected so as to provide to the crowns and consequently to the associated vessels $B_1$ and $B_2$ the same rotary speeds.

Crowns 28 and 29 are each provided with holes 47 through which pass the threads F.

The distributors 4 and 5 which must rotate at the same speed as their respective vessels bear on rollers 48 suitably located to support them. These distributors are driven from shaft 46 by chains 49 driving toothed pinions 50 in meshing engagement with toothed crowns 51 integral with the hub 52 of the respective distributor. A reversing gear 53 is disposed in the driving gearing of distributor 4 so as to drive the latter at the same speed but in a direction opposite to the one of distributor 5.

What is claimed is:

1. A machine for the manufacture of fibre glass reinforced resin tubing comprising a fibre thread distributor means, at least one impregnation annular vessel, a horizontally extending mandrel coaxial with said vessel for drawing the threads through the vessel, means for moving said mandrel axially away from said vessel, and means for rotating said vessel and distributor means at substantially the same speed.

2. A machine according to claim 1 wherein said annular vessel is provided on each of its lateral faces with a series of circumferentially located small holes providing passages for the threads.

3. A machine according to claim 2 wherein sealing gaskets are provided on each of said lateral faces, said gaskets being applied against the threads to provide a fluid tightness to said vessel at the location of said holes.

4. A machine according to claim 3 wherein said sealing gaskets comprise inflatable sealing means.

5. A machine according to claim 1 wherein said vessel comprises a body formed of two lateral flanges united by inner cylindrical ring and a non-rotatable cylindrical outer closure ring, sealing means being interposed between the latter and said flanges.

6. A machine according to claim 5 wherein said sealing means consist of inflatable seals.

7. A machine according to claim 1 which comprises at least two vessels and two respective distributor means, said vessels being disposed side by side, in stepped arrangement.

8. A machine according to claim 7 wherein said vessels and respective distributor means are driven by gears in opposite directions.

References Cited

FOREIGN PATENTS 592,640  2/1960  Canada.

BENJAMIN A. BORCHELT, Primary Examiner

T. H. WEBB, Assistant Examiner

U.S. Cl. X.R.

156—173